US012754296B2

(12) United States Patent
Ito

(10) Patent No.: US 12,754,296 B2
(45) Date of Patent: Oct. 6, 2026

(54) DISTANCE IMAGE GENERATION DEVICE AND DISTANCE IMAGE GENERATION METHOD

(71) Applicant: CANON KABUSHIKI KAISHA, Tokyo (JP)

(72) Inventor: Hideyuki Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 707 days.

(21) Appl. No.: 18/320,783

(22) Filed: May 19, 2023

(65) Prior Publication Data

US 2023/0384432 A1 Nov. 30, 2023

(30) Foreign Application Priority Data

May 27, 2022 (JP) ................................. 2022-086885

(51) Int. Cl.
*G01S 7/4863* (2020.01)
*G01S 7/4865* (2020.01)
*G01S 17/89* (2020.01)

(52) U.S. Cl.
CPC .......... *G01S 7/4863* (2013.01); *G01S 7/4865* (2013.01); *G01S 17/89* (2013.01)

(58) Field of Classification Search
CPC ........ G01S 7/4811; G01S 13/78; G01S 17/42; G01S 17/89; G01S 17/86; G01S 7/4816; G01S 17/08; G01S 17/66; G01S 17/58; G01S 13/86; G01S 19/37; G01S 7/418; G01S 19/42; G01S 7/4808; G01S 19/24; G01S 17/10; G01S 7/4865; G01S 5/0284; G01S 17/894; G01S 5/14; G01S 7/4863; G01S 13/76; G01S 17/46
See application file for complete search history.

(56) References Cited

U.S. PATENT DOCUMENTS

| | | | | |
|---|---|---|---|---|
| 2019/0305146 | A1* | 10/2019 | Kuroda | H10F 77/959 |
| 2019/0383946 | A1* | 12/2019 | Namba | G06V 20/58 |
| 2021/0003705 | A1 | 1/2021 | Izumi et al. | |
| 2022/0057520 | A1 | 2/2022 | Mahara | |
| 2022/0137224 | A1 | 5/2022 | Ono et al. | |

FOREIGN PATENT DOCUMENTS

| | | | | |
|---|---|---|---|---|
| CN | 111562590 A | 8/2020 | | |
| EP | 0654682 A2 * | 5/1995 | | G01S 17/14 |
| JP | 2020112443 A | 7/2020 | | |
| WO | 2022085555 A1 | 4/2022 | | |

* cited by examiner

*Primary Examiner* — Sanjiv D. Patel
(74) *Attorney, Agent, or Firm* — Canon.U.S.A., Inc. IP Division

(57) ABSTRACT

A distance image generation device including an acquisition unit configured to acquire a micro-frame constituted by a one-bit signal based on incident light to a photoelectric conversion element, and a synthesis unit configured to generate a sub-frame constituted by a multi-bit signal by synthesizing a plurality of the micro-frames acquired in different periods from each other. In one ranging frame period, the synthesis unit generates a first sub-frame and a second sub-frame, used for generating one distance image. The number of the plurality of micro-frames synthesized when generating the first sub-frame and the number of the plurality of micro-frames synthesized when generating the second sub-frame are different from each other.

19 Claims, 11 Drawing Sheets

DISTANCE IMAGE GENERATION DEVICE AND DISTANCE IMAGE GENERATION METHOD

BACKGROUND OF THE INVENTION

Field of the Invention

The present disclosure relates to a distance image generation device and a distance image generation method.

Description of the Related Art

Japanese Patent Application Laid-Open No. 2020-112443 discloses a ranging device that measures a distance to an object by emitting light from a light emitting unit and receiving light including reflected light from the object by a light receiving element. The ranging device disclosed in Japanese Patent Application Laid-Open No. 2020-112443 can perform ranging such that the ranging condition is changed while an imaging frame is formed. One example of the ranging condition is a sampling frequency.

In a distance image generation technology as described in Japanese Patent Application Laid-Open No. 2020-112443, in order to improve the distance measurement performance, there is a case in which it is required to achieve both an appropriate distance resolution and an improvement in the frame rate.

SUMMARY OF THE INVENTION

It is an object of the present disclosure to provide a distance image generation device and a distance image generation method with improved frame rates while ensuring appropriate distance resolution.

According to an aspect of the present disclosure, there is provided a distance image generation device including an acquisition unit configured to acquire a micro-frame constituted by a one-bit signal based on incident light to a photoelectric conversion element, and a synthesis unit configured to generate a sub-frame constituted by a multi-bit signal by synthesizing a plurality of the micro-frames acquired in different periods from each other. In one ranging frame period, the synthesis unit generates a first sub-frame and a second sub-frame used for generating one distance image. The number of the plurality of micro-frames synthesized when generating the first sub-frame and the number of the plurality of micro-frames synthesized when generating the second sub-frame are different from each other.

According to another aspect of the present disclosure, there is provided a distance image generation method including acquiring a micro-frame constituted by a one-bit signal based on incident light to a photoelectric conversion element, and generating a sub-frame constituted by a multi-bit signal by synthesizing a plurality of the micro-frames acquired in different periods from each other. In one ranging frame period, a first sub-frame and a second sub-frame used for generating one distance image are generated. The number of the plurality of micro-frames synthesized when generating the first sub-frame and the number of the plurality of micro-frames synthesized when generating the second sub-frame are different from each other.

Further features of the present disclosure will become apparent from the following description of embodiments with reference to the attached drawings.

DESCRIPTION OF THE EMBODIMENTS

Figure 1:
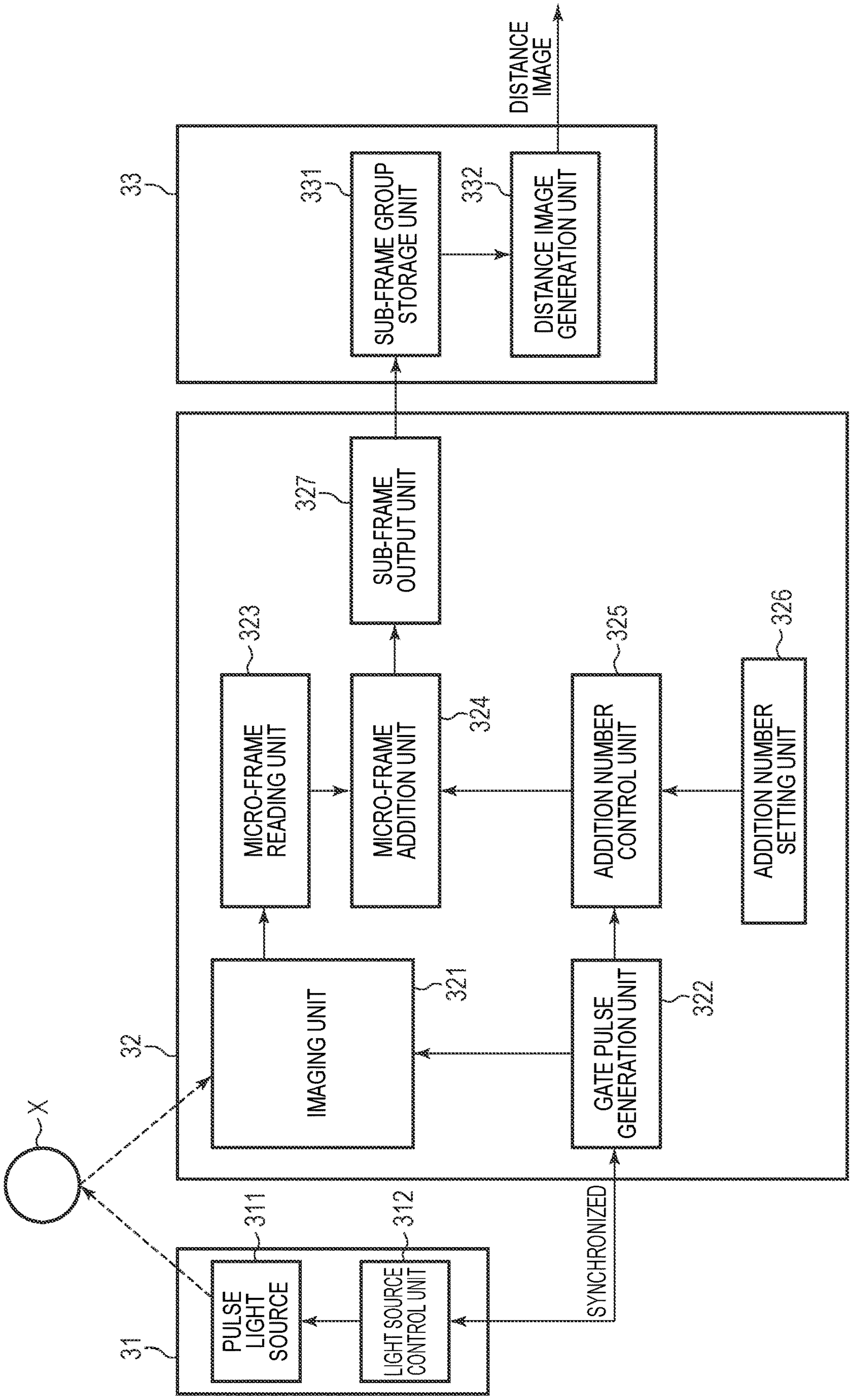
FIG. 1 is a block diagram illustrating a schematic configuration example of a distance image generation device according to a first embodiment.

Preferred embodiments of the present disclosure will now be described in detail in accordance with the accompanying drawings. In the drawings, the same or corresponding elements are denoted by the same reference numerals, and the description thereof may be omitted or simplified.

First Embodiment

Figure 2:
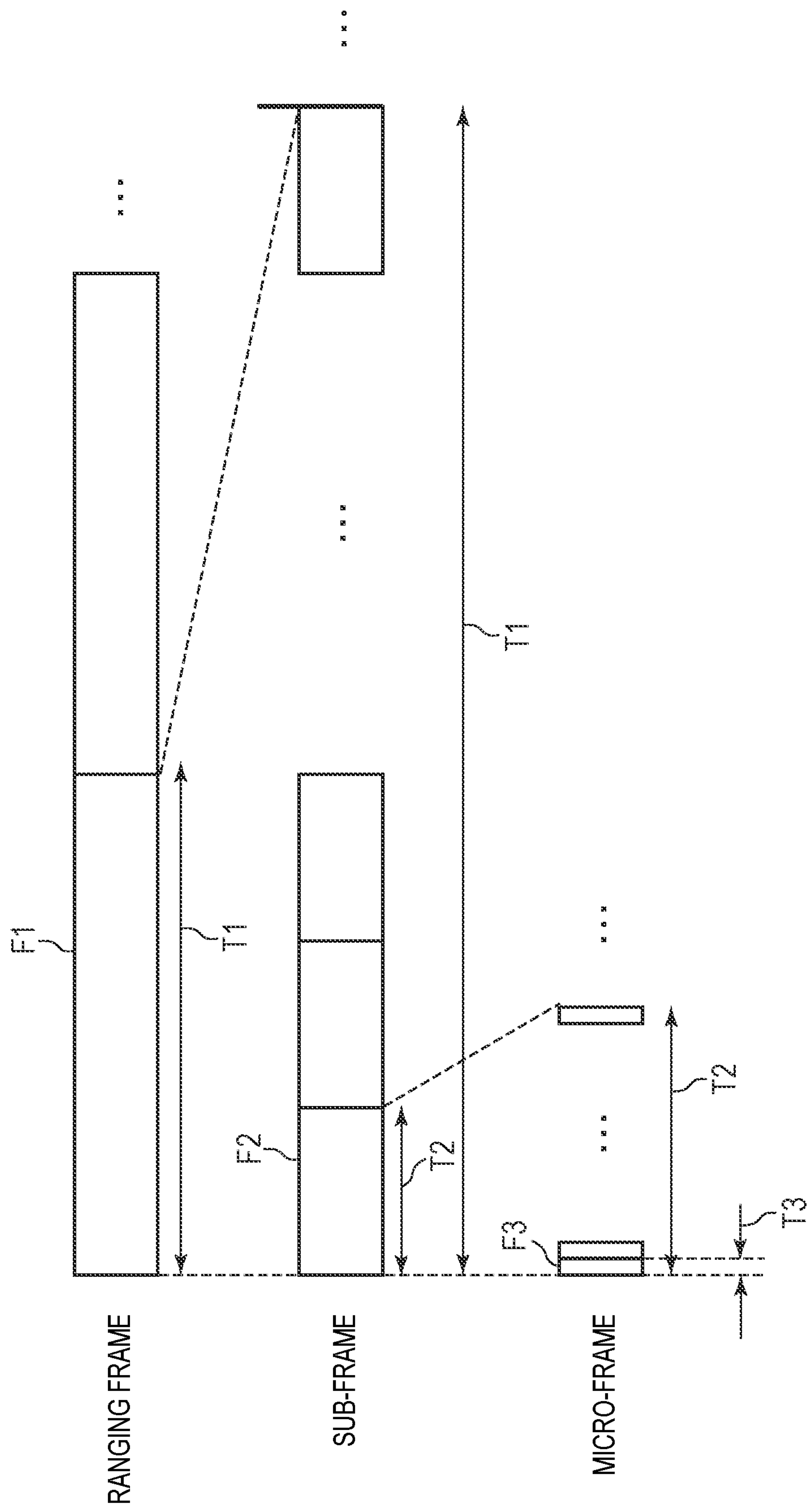
FIG. 2 is a schematic diagram for explaining a ranging frame, a sub-frame, and a micro-frame according to the first embodiment.
Figure 3:
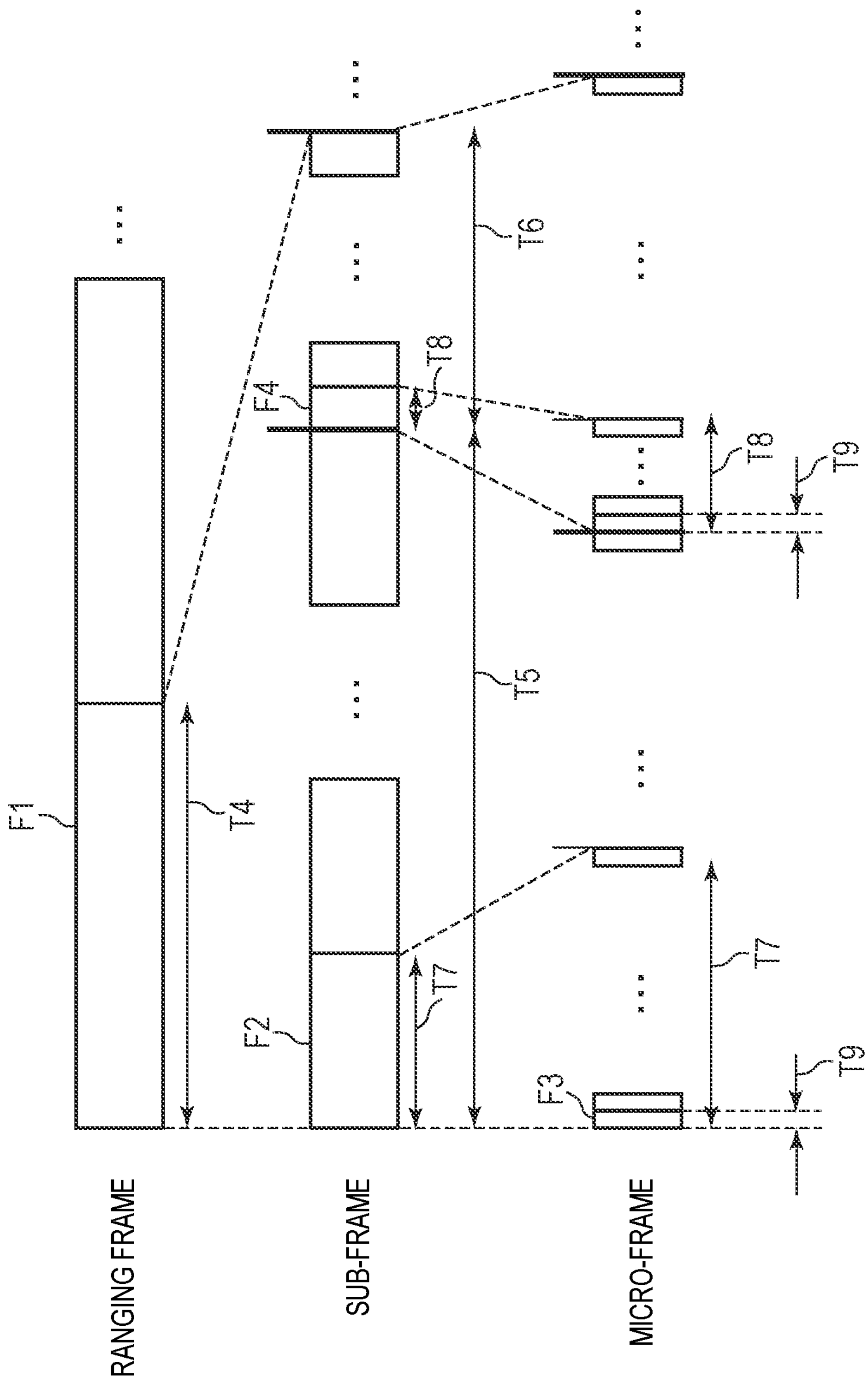
FIG. 3 is a diagram schematically illustrating an operation of the distance image generation device according to the first embodiment.
Figure 4:
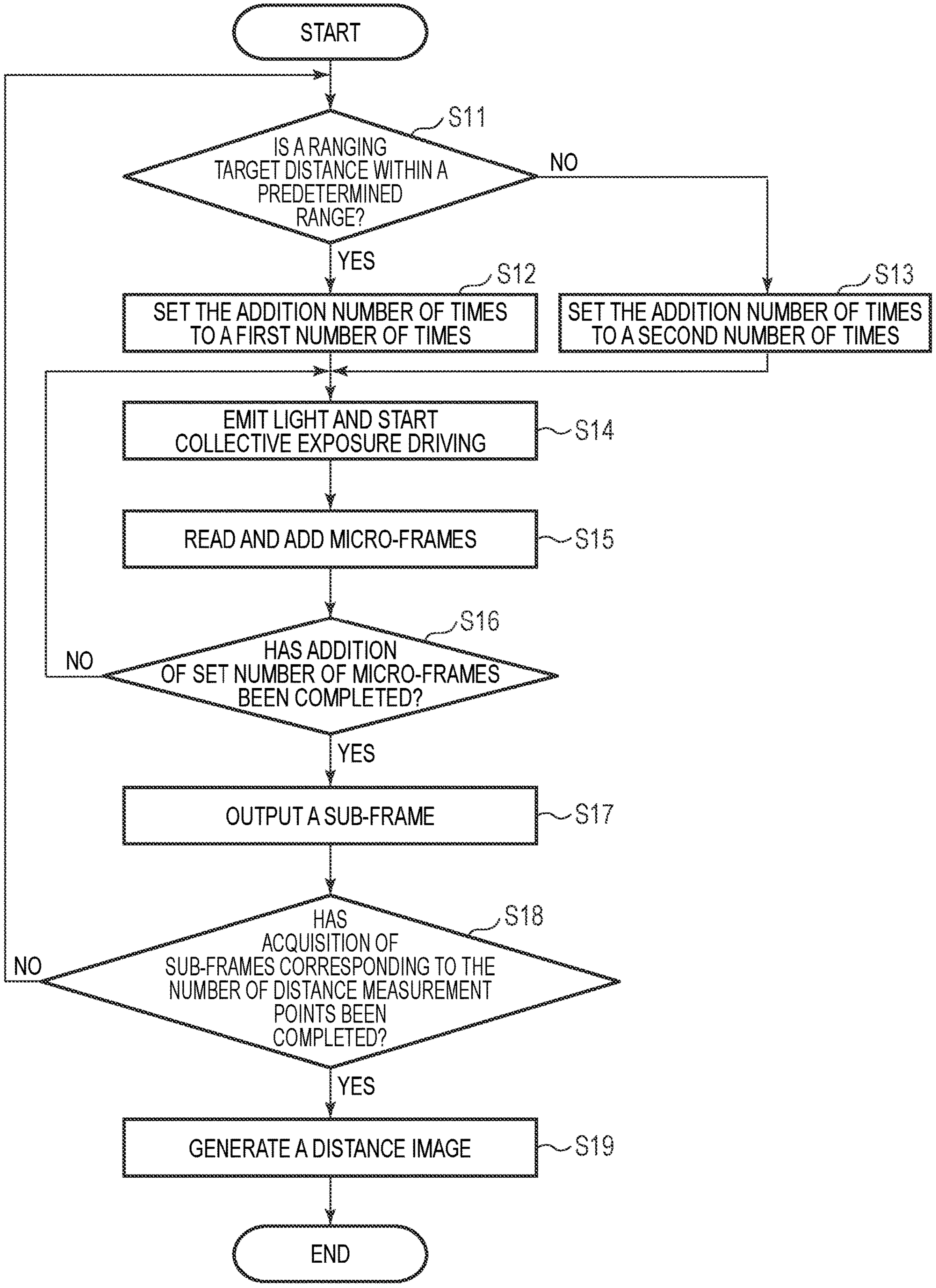
FIG. 4 is a flowchart illustrating an operation of the distance image generation device according to the first embodiment in one ranging frame period.

FIG. 1 is a block diagram illustrating a schematic configuration example of a distance image generation device according to the present embodiment. FIG. 2 is a schematic diagram for explaining a ranging frame, a sub-frame, and a micro-frame according to the present embodiment. FIG. 3 is a diagram schematically illustrating an operation of the distance image generation device according to the present embodiment. FIG. 4 is a flowchart illustrating an operation of the distance image generation device according to the present embodiment in one ranging frame period. The configuration of the distance image generation device according to the present embodiment will be described with reference to these drawings.

As illustrated in FIG. 1, the distance image generation device includes a light source device 31, a photodetection device 32, and an arithmetic processing device 33. The distance image generation device is a device that outputs a distance image by two-dimensionally measuring a plurality of points of distances to an object X existing within a predetermined ranging area. The distance image generation device measures the time difference until the light emitted from the light source device 31 is reflected by the object X and received by the photodetection device 32. Then, the distance image generation device calculates the distance from the distance image generation device to the object X based on the measured time difference. Such a ranging method is called a time-of-flight (TOF).

The light source device 31 includes a pulse light source 311 and a light source control unit 312. The pulse light source 311 is a light source such as a semiconductor laser device that emits pulsed light to the entire ranging area. The light source control unit 312 is a control circuit for controlling light emission timings of the pulse light source 311.

The photodetection device 32 includes an imaging unit 321, a gate pulse generation unit 322, a micro-frame reading unit 323, a micro-frame addition unit 324, an addition number control unit 325, an addition number setting unit 326, and a sub-frame output unit 327. The imaging unit 321 may be a photoelectric conversion device in which pixel circuits including photoelectric conversion elements are two-dimensionally arranged. Thereby, a two-dimensional distance image can be acquired. The imaging unit 321 may be, for example, a sensor including a single photon avalanche diode (SPAD), which is a kind of avalanche photodiode, as a photoelectric conversion element. In the following description, unless otherwise specified, it is assumed that the imaging unit 321 is an image sensor using SPAD.

The gate pulse generation unit 322 is a control circuit that outputs a control signal for controlling the driving timing of the imaging unit 321. Further, the gate pulse generation unit 322 transmits and receives a control signal to and from the light source control unit 312, thereby synchronously controlling the pulse light source 311 and the imaging unit 321. This makes it possible to perform imaging in which the time difference from the time at which light is emitted from the pulse light source 311 to the time at which light is received by the imaging unit 321 is controlled. In the present embodiment, it is assumed that the gate pulse generation unit 322 performs global gate driving of the imaging unit 321. The global gate driving is a driving method in which imaging is performed simultaneously in the same exposure period in all pixels in the imaging unit 321 using the emission time of the pulsed light from the pulse light source 311 as the reference time. In the global gate driving of the present embodiment, imaging is repeatedly performed while the collective exposure timings of all the pixels are sequentially shifted. Thus, the SPAD of each pixel of the imaging unit 321 simultaneously generates a one-bit signal indicating the presence or absence of an incident photon in each of a plurality of exposure periods.

The micro-frame reading unit 323, the micro-frame addition unit 324, the addition number control unit 325, and the addition number setting unit 326 are signal processing circuits that read out one-bit signals constituting a micro-frame from the imaging unit 321 and perform predetermined signal processing. The operation of each of these units will be described later in detail with reference to FIG. 4. The sub-frame output unit 327 is an interface that outputs a signal from the photodetection device 32 to the arithmetic processing device 33 in accordance with a predetermined standard. The sub-frame output unit 327 transmits a signal from the memory in the photodetection device 32 to the memory in the arithmetic processing device 33 by serial communication, for example.

The arithmetic processing device 33 includes a sub-frame group storage unit 331 and a distance image generation unit 332. The arithmetic processing device 33 is a computer including a processor that operates as the distance image generation unit 332, a memory that operates as the sub-frame group storage unit 331, and the like. The operation of each of these units will be described later with reference to FIG. 4.

Prior to the description of the driving method of the present embodiment, the configuration of the ranging frame, the sub-frame, and the micro-frame will be described with reference to FIG. 2. FIG. 2 schematically illustrates acquisition periods of ranging frames corresponding to distance images, sub-frames used for generation of the ranging frame, and micro-frames used for generation of the sub-frame by arranging blocks in the horizontal direction. The horizontal direction in FIG. 2 indicates the elapse of time, and one block indicates the acquisition period of one ranging frame, sub-frame, or micro-frame.

The ranging frame F1 corresponds to one distance image. That is, the ranging frame F1 has information corresponding to the distance to the object X calculated from the time difference from the emission of light to the reception of light for each of the plurality of pixels. In the present embodiment, it is assumed that distance images are acquired as a moving image, and one ranging frame F1 is repeatedly acquired every time one ranging frame period T1 elapses.

One ranging frame F1 is generated from a plurality of sub-frames F2. One ranging frame period T1 includes a plurality of sub-frame periods T2. Every time one sub-frame period T2 elapses, one sub-frame F2 is repeatedly acquired. The sub-frame F2 is constituted by a multi-bit signal corresponding to the amount of light incident in the sub-frame period T2.

One sub-frame F2 is generated from a plurality of micro-frames F3. One sub-frame period T2 includes a plurality of micro-frame periods T3. One micro-frame F3 is repeatedly acquired every time one micro-frame period T3 elapses. The micro-frame F3 is constituted by a one-bit signal indicating the presence or absence of incident light to the photoelectric conversion element in the micro-frame period T3. By adding and synthesizing a plurality of micro-frames of one-bit signals, one sub-frame F2 of a multi-bit signal is generated. Thus, one sub-frame F2 may be constituted by a multi-bit signal corresponding to the number of micro-frames in which incident light is detected within the sub-frame period T2.

In this manner, a plurality of sub-frames F2 in which incident light is acquired in different periods are acquired. The signal acquisition times can be associated with the distances from the distance image generation device to the distance measurement target. The signal acquisition time at which the signal value is maximized can be determined from the distribution of the signal acquisition times and the signal values of the plurality of sub-frames F2. Since it is estimated that the reflected light is incident on the imaging unit 321 at the time at which the signal value is maximized, the distance can be calculated by converting the signal acquisition time at which the signal value is maximized into the distance to the object X. Further, a distance image can be generated by calculating a distance for each pixel and acquiring a two-dimensional distribution of the distances.

In the example of FIG. 2, for simplicity of explanation, the lengths of the sub-frame periods T2 included in the ranging frame period T1 are all the same. However, in the driving method of the present embodiment illustrated in FIGS. 3 and 4, since the number of micro-frames used for generating one sub-frame is variable, the lengths of a plurality of sub-frame periods within one ranging frame period may not be identical to each other.

Next, with reference to FIGS. 3 and 4, a driving method of the distance image generation device of the present embodiment will be described. FIG. 3 schematically illustrates acquisition periods of ranging frames, sub-frames, and micro-frames in the present embodiment in the same format as in FIG. 2. The difference between FIG. 3 and FIG. 2 is that lengths of a plurality of sub-frame periods in one ranging frame period are different from each other. FIG. 4 illustrates an example of a driving method capable of acquiring ranging frames, sub-frames, and micro-frames as illustrated in FIG. 3. FIG. 4 illustrates a driving method of the distance image generation device in one ranging frame period T4. The driving method of the present embodiment will be described with reference to the flowchart of FIG. 4.

In the flowchart illustrated in FIG. 4, the processing from "start" to "end" indicates processing performed in a ranging frame period T4 in which one ranging frame F1 in FIG. 3 is acquired. Processing of one cycle in a loop from step S11 to step S18 is performed in a short-distance sub-frame period T7 or a long-distance sub-frame period T8 for acquiring one sub-frame F2 in FIG. 3. Processing of one cycle in a loop from step S14 to step S16 is performed in a micro-frame period T9 in which one micro-frame F3 is acquired in FIG. 3.

In the step S11, the addition number setting unit 326 determines whether or not a ranging target distance is within a predetermined range. Since the ranging target distance corresponds to the difference between the light emission time and the time related to the sub-frame at which imaging is currently performed, the ranging target distance can be acquired from, for example, setting information of the gate pulse in the gate pulse generation unit 322 or the like. Further, the predetermined range may be, for example, a range in which a distance from the distance image generation device is 0 meters or more and 10 meters or less. In this case, a distance greater than 10 meters is outside the predetermined range. In this case, the addition number setting unit 326 determines whether the ranging target distance is equal to or less than the threshold value or greater than the threshold value using 10 meters as a threshold value.

When the ranging target distance is within the predetermined range (YES in the step S11), the process proceeds to step S12. In this case, in the step S12, the addition number setting unit 326 sets a first number of times (for example, 64 times) as the addition number of times, and supplies this setting information to the addition number control unit 325.

When the ranging target distance is out of the predetermined range (NO in the step S11), the process proceeds to step S13. In this case, in the step S13, the addition number setting unit 326 sets a second number of times (for example, 16 times) different from the first number of times as the addition number of times, and supplies this setting information to the addition number control unit 325.

In the step S14, the light source control unit 312 controls the pulse light source 311 to emit pulsed light within a predetermined ranging area. In synchronization with this, the gate pulse generation unit 322 controls the imaging unit 321 to start imaging by the global gate driving.

In step S15, the micro-frame reading unit 323 reads the micro-frame from the imaging unit 321 every time the micro-frame period elapses. The read micro-frame is held in the memory of the micro-frame addition unit 324. This memory has a storage capacity capable of holding multi-bit data for each pixel. The micro-frame addition unit 324 sequentially adds the value of the micro-frame to the value held in the memory every time the micro-frame is read out. Thus, the micro-frame addition unit 324 adds a plurality of micro-frames in the sub-frame period to generate a sub-frame. The addition number in the micro-frame addition unit 324 is controlled by the addition number control unit 325. In this way, the micro-frame reading unit 323 functions as an acquisition unit that acquires a micro-frame constituted by a one-bit signal based on incident light to the photoelectric conversion element. The micro-frame addition unit 324 functions as a synthesis unit for synthesizing a plurality of micro-frames acquired in different periods.

In the step S16, the micro-frame addition unit 324 determines whether or not addition of the micro-frames of the number of times set in the step S12 or the step S13 has been completed. When the addition of the set number of micro-frames has not been completed (NO in the step S16), the process proceeds to the step S14, and reading of the next micro-frame is performed. When the addition of the set number of micro-frames has been completed (YES in the step S16), the process proceeds to step 517. When the first number of times is set in the step S12, a sub-frame (first sub-frame) in which the same number of micro-frames as the first number of times (first number of micro-frames) are added is acquired in the loop from the step S14 to the step S16. When the second number of times is set in the step S13, a sub-frame (second sub-frame) in which the same number of micro-frames as the second number of times (second number of micro-frames) are added is acquired.

In the step 517, the sub-frame output unit 327 reads the sub-frame that the addition has been completed from the memory of the micro-frame addition unit 324 and outputs the sub-frame to the sub-frame group storage unit 331. The sub-frame group storage unit 331 stores the sub-frame output from the sub-frame output unit 327. The sub-frame group storage unit 331 is configured to store a plurality of sub-frames used for generating one ranging frame individually for each sub-frame period.

In the step S18, the arithmetic processing device 33 determines whether or not the sub-frame group storage unit 331 has completed acquiring sub-frames corresponding to a predetermined number of sub-frames (that is, the number of distance measurement points). When the acquisition of the sub-frames corresponding to the number of distance measurement points has not been completed (NO in the step S18), the process proceeds to the step S11, and a plurality of micro-frames are acquired and added again in order to read the next sub-frame. In this case, the same processing is performed by shifting the start time of the global gate driving with respect to the light emission time by one sub-frame period. When the acquisition of sub-frames corresponding to the number of distance measurement points has been completed (YES in the step S18), the process proceeds to step S19. By the loop from the step S11 to the step S18, sub-frames corresponding to the number of distance measurement points are acquired.

In the step S19, the distance image generation unit 332 acquires a plurality of sub-frames in one ranging frame period from the sub-frame group storage unit 331. The distance image generation unit 332 generates a distance image indicating a two-dimensional distribution of distances by calculating a distance corresponding to a sub-frame having a maximum signal value for each pixel. Then, the distance image generation unit 332 outputs a distance image to a device outside the arithmetic processing device 33. This distance image may be used, for example, to detect a surrounding environment of a vehicle. The distance image generation unit 332 may store the distance image in a memory inside the distance image generation device.

In the driving method of FIG. 4 as described above, as illustrated in FIG. 3, sub-frames are generated such that a plurality of sub-frame periods within one ranging frame period are different from each other. This will be described with reference to FIGS. 3 and 4.

For example, it is assumed that the distance measurement range of the distance image generation device of the present embodiment is 100 meters, and the predetermined range in the determination of the step S11 is a range of 0 meters or more and 10 meters or less. The first number of times set in the step S12 is 64, and the second number of times set in the step S13 is 16. In this case, in sub-frames (corresponding to a short distance of 10 meters or less) acquired in a relatively early period from the first sub-frame to a predetermined number (k) of sub-frames, addition of micro-frames is performed 64 times. Then, in sub-frames (corresponding to a long distance of more than 10 meters) acquired in the (k+1)-th or later relatively late period, addition of the micro-frames is performed 16 times. This operation is schematically illustrated in FIG. 3.

That is, as illustrated in FIG. 3, the ranging frame period T4 is divided into a short-distance ranging frame period T5 in the former part and a long-distance ranging frame period T6. In the short-distance ranging frame period T5, the sub-frame F2 is acquired by adding 64 micro-frames F3 in the short-distance sub-frame period T7. In this case, the sub-frame F2 (first sub-frame) has six-bit gradation. In the long-distance ranging frame period T6, 16 micro-frames F3 are added in the long-distance sub-frame period T8 to acquire a sub-frame F4 (second sub-frame). In this case, the sub-frame F4 has four-bit gradation.

In the long-distance ranging frame period T6, since the number of micro-frames F3 to be added is reduced, the sub-frame F4 can be acquired in a shorter time than in the case of the short-distance ranging frame period T5. As a result, as illustrated in FIG. 2, the time required for acquiring one frame (the length of the ranging frame period T4) is shortened as compared with the case where a constant number of micro-frames are acquired and added in the entire ranging frame period. Therefore, the frame rate can be improved.

In general, when a predetermined distance range is measured at a certain distance step number (distance resolution), the number of measurement points is generally a value obtained by dividing the distance range by the distance step number. As the number of measurement points increases, the frame rate of distance measurement decreases, and it is difficult to achieve both the distance resolution and the frame rate. However, as in the case where the distance image generation device according to the present embodiment is used in a vehicle, there may be a use case in which high accuracy is required for distance measurement at a short distance, but high accuracy is not required for distance measurement at a long distance. In such a case, with respect to the sub-frame F4 corresponding to the distance measurement of the long distance, even if the improvement of the frame rate is prioritized by reducing the number of gradations of the distance image, the influence on the overall distance measurement accuracy is low. Therefore, in such a use case, it is desirable that the number of combined micro-frames F3 in the long-distance ranging frame period T6 be smaller than the number of combined micro-frames F3 in the short-distance ranging frame period T5 as in the present embodiment. Thereby, the frame rate can be improved while maintaining the distance resolution in the short distance.

As described above, according to the present embodiment, it is possible to provide a distance image generation device and a distance image generation method with improved frame rates while ensuring appropriate distance resolution.

Further, in the distance image generation device of the present embodiment, unlike the method of changing the sampling frequency for each readout line of one frame as in Japanese Patent Application Laid-Open No. 2020-112443, it is not required to change the distance resolution for each pixel in one ranging frame. Therefore, in the distance image generation device of the present embodiment, by making the number of bits of a multi-bit signal constituting one sub-frame the same in each pixel, the distance resolution of each pixel can be constant in one ranging frame.

Note that the sub-frames of six-bit gradation and the sub-frames of four-bit gradation may be mixed in the plurality of sub-frames used in generating the distance image in the step S19 of the present embodiment. Therefore, the sub-frame output unit 327 or the distance image generation unit 332 may correct the gradation of one of the sub-frame of six-bit gradation and the sub-frame of four-bit gradation before generating the distance image to align the numbers of gradations. Thus, the accuracy of distance calculation can be improved.

In contrast to the above-described use case, there may be a use case where high detection accuracy is required for long distance ranging, but detection accuracy is not so required for short distance ranging. In such a case, the predetermined range in the determination of the step S11 may be set to the long distance side instead of the short distance side. For example, in the determination of the step S11, a range of a distance greater than 10 meters is set as a predetermined range, and the first number of times and the second number of times are set to the same as described above. In this case, in a sub-frame corresponding to the short distance from the first sub-frame to a predetermined number (k) of sub-frames, addition of micro-frames is performed 16 times (corresponding to four bits). Then, in the sub-frames corresponding to the long distance of the (k+1)-th and subsequent, addition of the micro-frames is performed 64 times (corresponding to six bits). By setting the predetermined range and the number of additions in this manner, the frame rate can be improved while maintaining the distance resolution in a long distance.

In the above example, either the first number of times or the second number of times of addition is set by determining the ranging target distance in the step S11, but the number of times of addition is not limited to two categories. For example, in the step S11, it may be determined which of the three kinds of distance measurement target distances (for example, short distance, medium distance, and long distance) is, and either the first number of times, the second number of times, or the third number of times of addition may be set according to the determination result. As described above, the number of additions may be three or more.

Second Embodiment

In the present embodiment, a specific configuration example of a photoelectric conversion device that includes an avalanche photodiode and that can be applied to the photodetection device 32 in the distance image generation device according to the first embodiment will be described. The configuration example of the present embodiment is an example, and the photoelectric conversion device applicable to the distance image generation device is not limited thereto.

Figure 5:
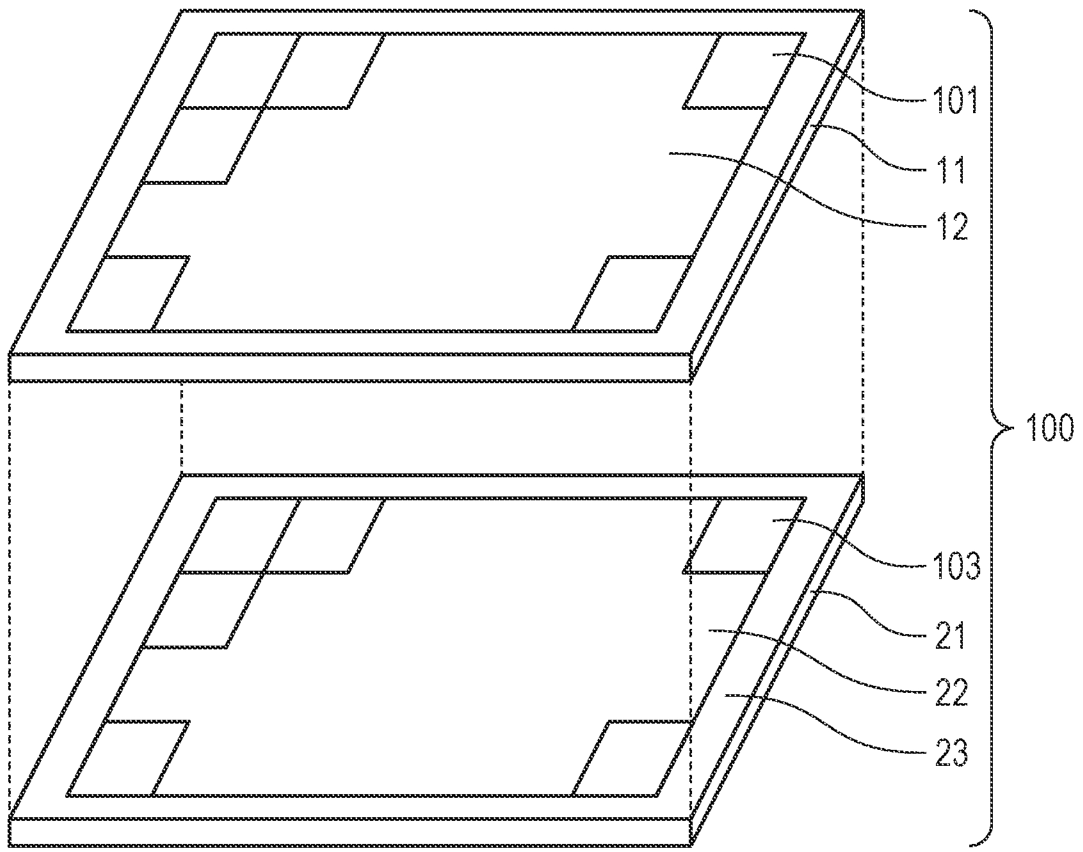
FIG. 5 is a schematic diagram illustrating an overall configuration of a photoelectric conversion device according to a second embodiment.

FIG. 5 is a schematic diagram illustrating an overall configuration of the photoelectric conversion device 100 according to the present embodiment. The photoelectric conversion device 100 includes a sensor substrate 11 (first substrate) and a circuit substrate 21 (second substrate) stacked on each other. The sensor substrate 11 and the circuit substrate 21 are electrically connected to each other. The sensor substrate 11 has a pixel region 12 in which a plurality of pixel circuits 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged outside the first circuit region 22. The second circuit region 23 may include a circuit for controlling the plurality of pixel signal processing units 103. The sensor substrate 11 has a light incident surface for receiving incident light and a connection surface opposed to the light incident surface. The sensor substrate 11 is connected to the circuit substrate 21 on the connection surface side. That is, the photoelectric conversion device 100 is a so-called backside illumination type.

In this specification, the term "plan view" refers to a view from a direction perpendicular to a surface opposite to the light incident surface. The cross section indicates a surface in a direction perpendicular to a surface opposite to the light incident surface of the sensor substrate 11. Although the light incident surface may be a rough surface when viewed microscopically, in this case, a plan view is defined with reference to the light incident surface when viewed macroscopically.

In the following description, the sensor substrate 11 and the circuit substrate 21 are diced chips, but the sensor substrate 11 and the circuit substrate 21 are not limited to chips. For example, the sensor substrate 11 and the circuit substrate 21 may be wafers. When the sensor substrate 11 and the circuit substrate 21 are diced chips, the photoelectric conversion device 100 may be manufactured by being diced after being stacked in a wafer state, or may be manufactured by being stacked after being diced.

Figure 6:
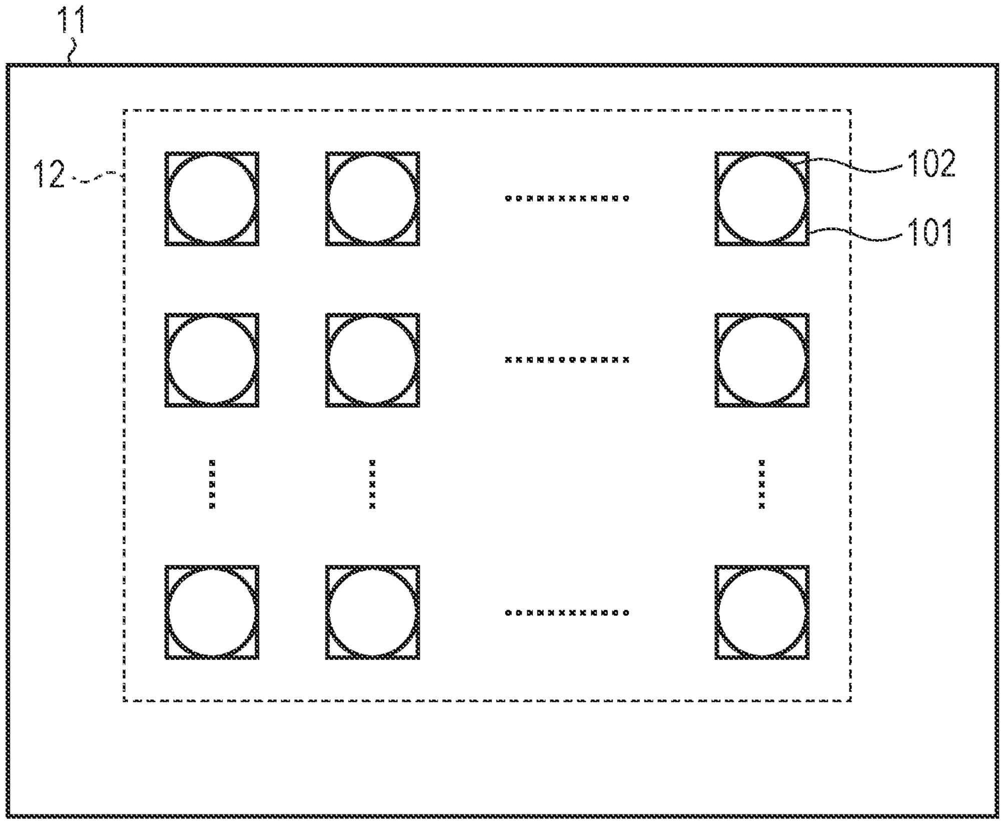
FIG. 6 is a schematic block diagram illustrating a configuration example of a sensor substrate according to the second embodiment.

FIG. 6 is a schematic block diagram illustrating an arrangement example of the sensor substrate 11. In the pixel region 12, a plurality of pixel circuits 101 are arranged to form a plurality of rows and a plurality of columns. Each of the plurality of pixel circuits 101 includes a photoelectric conversion unit 102 including an avalanche photodiode (hereinafter referred to as APD) as a photoelectric conversion element in the substrate.

Of the charge pairs generated in the APD, the conductivity type of the charge used as the signal charge is referred to as a first conductivity type. The first conductivity type refers to a conductivity type in which a charge having the same polarity as the signal charge is a majority carrier. Further, a conductivity type opposite to the first conductivity type, that is, a conductivity type in which a majority carrier is a charge having a polarity different from that of a signal charge is referred to as a second conductivity type. In the APD described below, the anode of the APD is set to a fixed potential, and a signal is extracted from the cathode of the APD. Accordingly, the semiconductor region of the first conductivity type is an N-type semiconductor region, and the semiconductor region of the second conductivity type is a P-type semiconductor region. Note that the cathode of the APD may have a fixed potential and a signal may be extracted from the anode of the APD. In this case, the semiconductor region of the first conductivity type is the P-type semiconductor region, and the semiconductor region of the second conductivity type is then N-type semiconductor region. Although the case where one node of the APD is set to a fixed potential is described below, potentials of both nodes may be varied.

Figure 7:
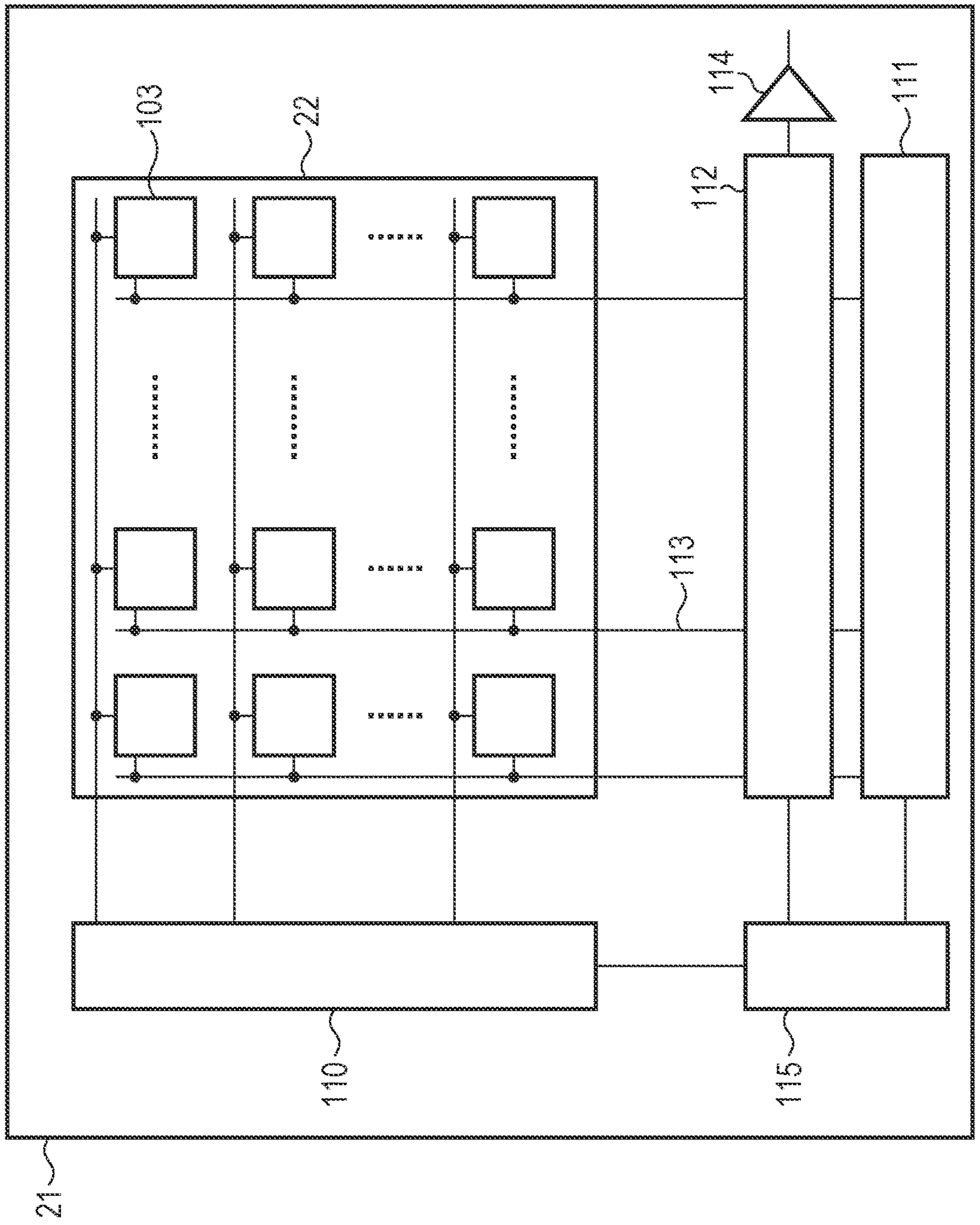
FIG. 7 is a schematic block diagram illustrating a configuration example of a circuit substrate according to the second embodiment.

FIG. 7 is a schematic block diagram illustrating a configuration example of the circuit substrate 21. The circuit substrate 21 has the first circuit region 22 in which a plurality of pixel signal processing units 103 are arranged to form a plurality of rows and a plurality of columns.

The circuit substrate 21 includes a vertical scanning circuit 110, a horizontal scanning circuit 111, a reading circuit 112, a pixel output signal line 113, an output circuit 114, and a control signal generation unit 115. The plurality of photoelectric conversion units 102 illustrated in FIG. 6 and the plurality of pixel signal processing units 103 illustrated in FIG. 7 are electrically connected to each other via connection wirings provided for each pixel circuit 101.

The control signal generation unit 115 is a control circuit that generates control signals for driving the vertical scanning circuit 110, the horizontal scanning circuit 111, and the reading circuit 112, and supplies the control signals to these units. As a result, the control signal generation unit 115 controls the driving timings and the like of each unit.

The vertical scanning circuit 110 supplies control signals to each of the plurality of pixel signal processing units 103 based on the control signal supplied from the control signal generation unit 115. The vertical scanning circuit 110 supplies control signals for each row to the pixel signal processing unit 103 via a driving line provided for each row of the first circuit region 22. As will be described later, a plurality of driving lines may be provided for each row. A logic circuit such as a shift register or an address decoder can be used for the vertical scanning circuit 110. Thus, the vertical scanning circuit 110 selects a row to be output a signal from the pixel signal processing unit 103.

The signal output from the photoelectric conversion unit 102 of the pixel circuit 101 is processed by the pixel signal processing unit 103. The pixel signal processing unit 103 acquires and holds a digital signal by counting the number of pulses output from the APD included in the photoelectric conversion unit 102.

It is not always necessary to provide one pixel signal processing unit 103 for each of the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

The horizontal scanning circuit 111 supplies control signals to the reading circuit 112 based on a control signal supplied from the control signal generation unit 115. The pixel signal processing unit 103 is connected to the reading circuit 112 via a pixel output signal line 113 provided for each column of the first circuit region 22. The pixel output signal line 113 in one column is shared by a plurality of pixel signal processing units 103 in the corresponding column. The pixel output signal line 113 includes a plurality of wirings, and has at least a function of outputting a digital signal from the pixel signal processing unit 103 to the reading circuit 112, and a function of supplying a control signal for selecting a column for outputting a signal to the pixel signal processing unit 103. The reading circuit 112 outputs a signal to an external storage unit or signal processing unit of the photoelectric conversion device 100 via the output circuit 114 based on the control signal supplied from the control signal generation unit 115.

The arrangement of the photoelectric conversion units 102 in the pixel region 12 may be one-dimensional. Further, the function of the pixel signal processing unit 103 does not necessarily have to be provided one by one in all the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

As illustrated in FIGS. 6 and 7, the first circuit region 22 having a plurality of pixel signal processing units 103 is arranged in a region overlapping the pixel region 12 in the plan view. In the plan view, the vertical scanning circuit 110, the horizontal scanning circuit 111, the reading circuit 112, the output circuit 114, and the control signal generation unit 115 are arranged so as to overlap a region between an edge of the sensor substrate 11 and an edge of the pixel region 12. In other words, the sensor substrate 11 includes the pixel region 12 and a non-pixel region arranged around the pixel region 12. In the circuit substrate 21, the second circuit region 23 having the vertical scanning circuit 110, the horizontal scanning circuit 111, the reading circuit 112, the output circuit 114, and the control signal generation unit 115 is arranged in a region overlapping with the non-pixel region in the plan view.

Note that the arrangement of the pixel output signal line 113, the arrangement of the reading circuit 112, and the arrangement of the output circuit 114 are not limited to those illustrated in FIG. 7. For example, the pixel output signal lines 113 may extend in the row direction, and may be shared by a plurality of pixel signal processing units 103 in corresponding rows. The reading circuit 112 may be provided so as to be connected to the pixel output signal line 113 of each row.

Figure 8:
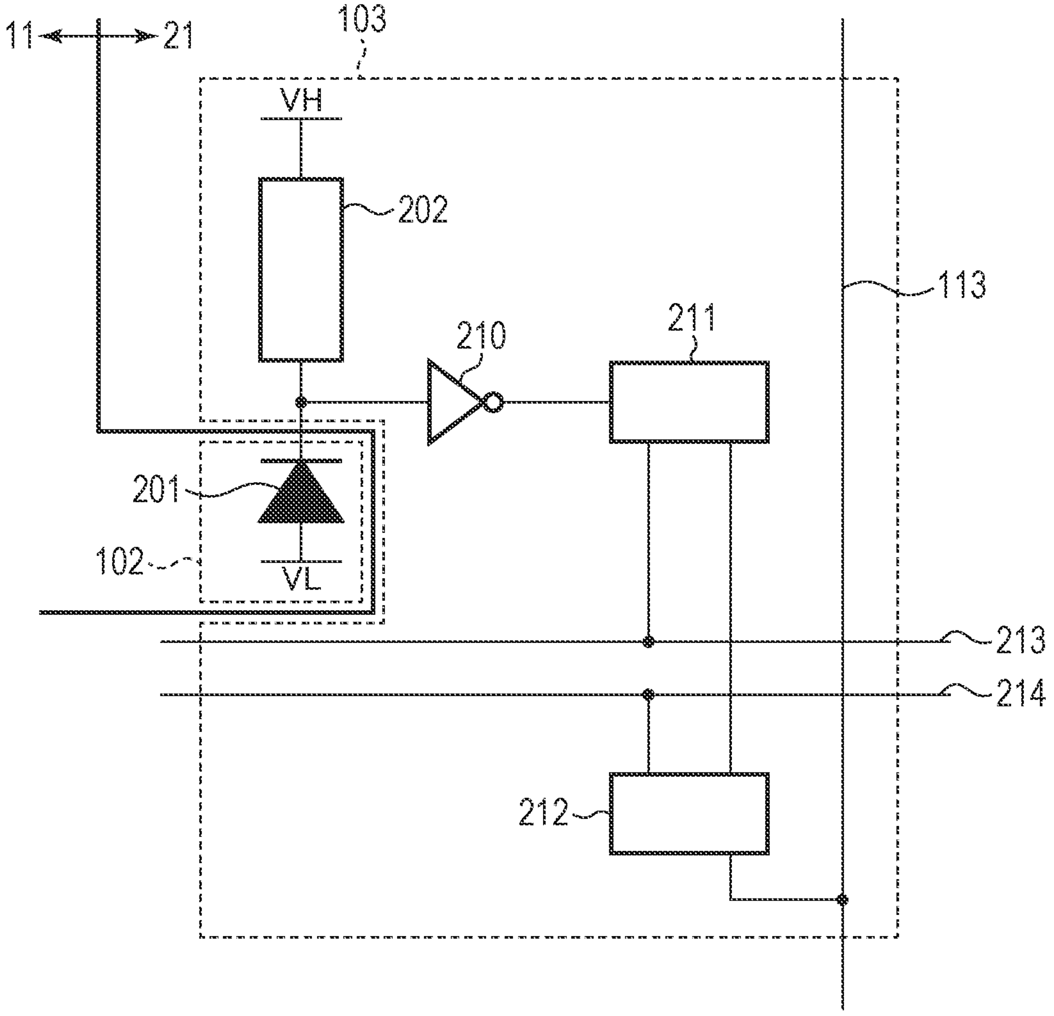
FIG. 8 is a schematic block diagram illustrating a configuration example of one pixel circuit of a photoelectric conversion unit and a pixel signal processing unit according to the second embodiment.

FIG. 8 is a schematic block diagram illustrating a configuration example of one pixel of the photoelectric conversion unit 102 and the pixel signal processing unit 103 according to the present embodiment. FIG. 8 schematically illustrates a more specific configuration example including a connection relationship between the photoelectric conversion unit 102 arranged in the sensor substrate 11 and the pixel signal processing unit 103 arranged in the circuit substrate 21. In FIG. 8, driving lines between the vertical scanning circuit 110 and the pixel signal processing unit 103 in FIG. 7 are illustrated as driving lines 213 and 214.

The photoelectric conversion unit 102 includes an APD 201. The pixel signal processing unit 103 includes a quenching element 202, a waveform shaping unit 210, a counter circuit 211, and a selection circuit 212. The pixel signal processing unit 103 may include at least one of the waveform shaping unit 210, the counter circuit 211, and the selection circuit 212.

The APD 201 generates charge pairs corresponding to incident light by photoelectric conversion. A voltage VL (first voltage) is supplied to the anode of the APD 201. The cathode of the APD 201 is connected to a first terminal of the quenching element 202 and an input terminal of the waveform shaping unit 210. A voltage VH (second voltage) higher than the voltage VL supplied to the anode is supplied to the cathode of the APD 201. As a result, a reverse bias voltage that causes the APD 201 to perform the avalanche multiplication operation is supplied to the anode and the cathode of the APD 201. In the APD 201 to which the reverse bias voltage is supplied, when a charge is generated by the incident light, this charge causes avalanche multiplication, and an avalanche current is generated.

The operation modes in the case where a reverse bias voltage is supplied to the APD 201 include a Geiger mode and a linear mode. The Geiger mode is a mode in which a potential difference between the anode and the cathode is higher than a breakdown voltage, and the linear mode is a mode in which a potential difference between the anode and the cathode is near or lower than the breakdown voltage.

The APD operated in the Geiger mode is referred to as a single photon avalanche diode (SPAD). In this case, for example, the voltage VL (first voltage) is −30 V, and the voltage VH (second voltage) is 1 V. The APD 201 may operate in the linear mode or the Geiger mode. In the case of the SPAD, a potential difference becomes greater than that of the APD of the linear mode, and the effect of avalanche multiplication becomes significant, so that the SPAD is preferable.

The quenching element 202 functions as a load circuit (quenching circuit) when a signal is multiplied by avalanche multiplication. The quenching element 202 suppresses the voltage supplied to the APD 201 and suppresses the avalanche multiplication (quenching operation). Further, the quenching element 202 returns the voltage supplied to the APD 201 to the voltage VH by passing a current corresponding to the voltage drop due to the quenching operation (recharge operation). The quenching element 202 may be, for example, a resistive element.

The waveform shaping unit 210 shapes the potential change of the cathode of the APD 201 obtained at the time of photon detection, and outputs a pulse signal. For example, an inverter circuit is used as the waveform shaping unit 210. Although FIG. 8 illustrates an example in which one inverter is used as the waveform shaping unit 210, the waveform shaping unit 210 may be a circuit in which a plurality of inverters are connected in series, or may be another circuit having a waveform shaping effect.

The counter circuit 211 counts the pulse signals output from the waveform shaping unit 210, and holds a digital signal indicating the count value. When a control signal is supplied from the vertical scanning circuit 110 illustrated in FIG. 7 through the driving line 213 illustrated in FIG. 8, the counter circuit 211 resets the held signal.

The selection circuit 212 is supplied with a control signal from the vertical scanning circuit 110 illustrated in FIG. 7 through the driving line 214 illustrated in FIG. 8. In response to this control signal, the selection circuit 212 switches between the electrical connection and the non-connection of the counter circuit 211 and the pixel output signal line 113. The selection circuit 212 includes, for example, a buffer circuit or the like for outputting a signal corresponding to a value held in the counter circuit 211. In the example of FIG. 8, the selection circuit 212 switches between the electrical connection and the non-connection of the counter circuit 211 and the pixel output signal line 113; however, the method of controlling the signal output to the pixel output signal line 113 is not limited thereto. For example, a switch such as a transistor may be arranged at a node such as between the quenching element 202 and the APD 201 or between the photoelectric conversion unit 102 and the pixel signal processing unit 103, and the signal output to the pixel output signal line 113 may be controlled by switching the electrical connection and the non-connection. Alternatively, the signal output to the pixel output signal line 113 may be controlled by changing the value of the voltage VH or the voltage VL supplied to the photoelectric conversion unit 102 using a switch such as a transistor.

Figure 9A:
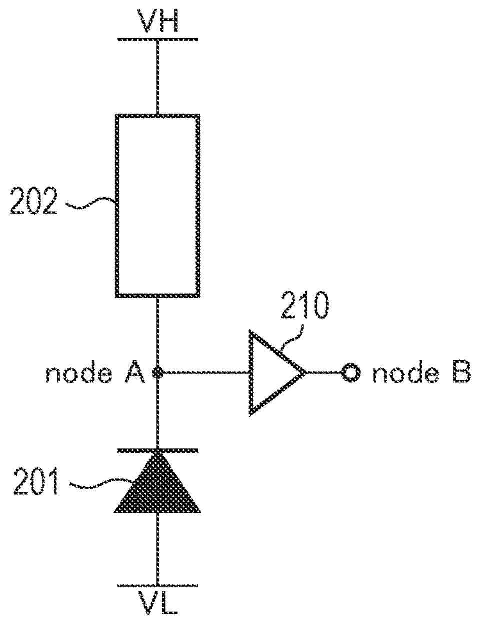
FIGS. 9A, 9B and 9C are diagrams illustrating an operation of an avalanche photodiode according to the second embodiment.
Figure 9B:
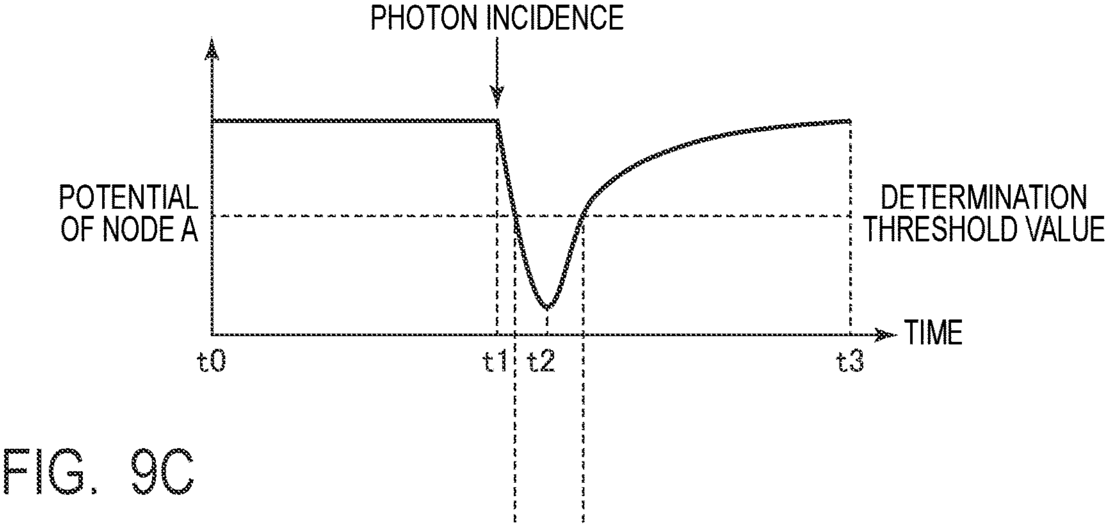
Figure 9C:
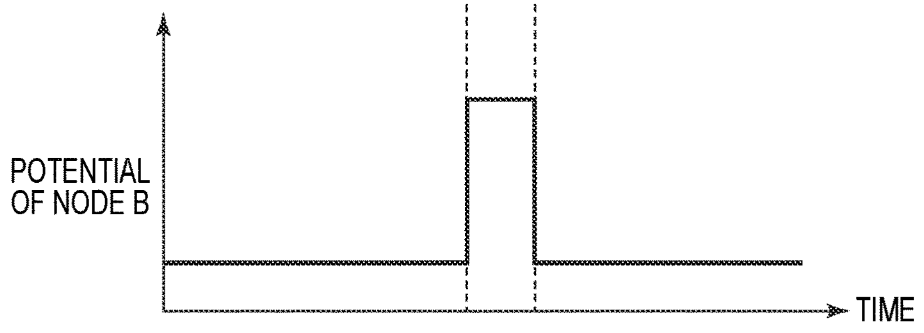

FIGS. 9A, 9B, and 9C are diagrams illustrating an operation of the APD 201 according to the present embodiment.

FIG. 9A is a diagram illustrating the APD 201, the quenching element 202, and the waveform shaping unit 210 in FIG. 8. As illustrated in FIG. 9A, the connection node of the APD 201, the quenching element 202, and the input terminal of the waveform shaping unit 210 is referred to as node A. Further, as illustrated in FIG. 9A, an output side of the waveform shaping unit 210 is referred to as node B.

FIG. 9B is a graph illustrating a temporal change in the potential of node A in FIG. 9A. FIG. 9C is a graph illustrating a temporal change in the potential of node B in FIG. 9A. During a period from time t0 to time t1, the voltage VH-VL is applied to the APD 201 in FIG. 9A. When a photon enters the APD 201 at the time t1, avalanche multiplication occurs in the APD 201. As a result, an avalanche current flows through the quenching element 202, and the potential of the node A drops. Thereafter, the amount of potential drop further increases, and the voltage applied to the APD 201 gradually decreases. Then, at time t2, the avalanche multiplication in the APD 201 stops. Thereby, the voltage level of node A does not drop below a certain constant value. Then, during a period from the time t2 to time t3, a current that compensates for the voltage drop flows from the node of the voltage VH to the node A, and the node A is settled to the original potential at the time t3.

In the above-described process, the potential of node B becomes the high level in a period in which the potential of node A is lower than a certain threshold value. In this way, the waveform of the drop of the potential of the node A caused by the incidence of the photon is shaped by the waveform shaping unit 210 and output as a pulse to the node B.

The imaging unit 321 of the first embodiment corresponds to, for example, the photoelectric conversion unit 102 and the pixel signal processing unit 103 of the present embodiment. The gate pulse generation unit 322 in the first embodiment corresponds to, for example, the control signal generation unit 115, the vertical scanning circuit 110, and the horizontal scanning circuit 111 of the present embodiment.

According to the present embodiment, a photoelectric conversion device using an avalanche photodiode which can be applied to the distance image generation device of the first embodiment is provided.

Third Embodiment

Figure 10:
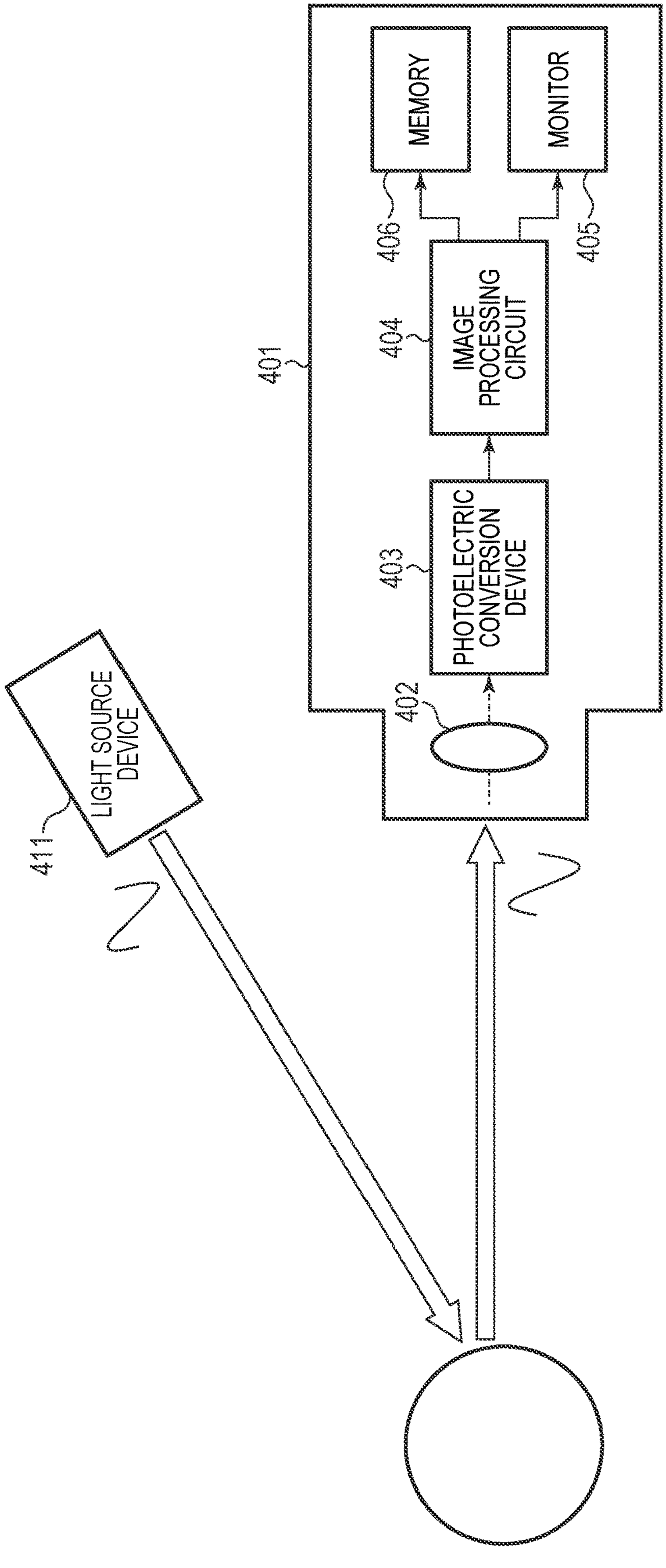
FIG. 10 is a schematic diagram of a photodetection system according to a third embodiment.

FIG. 10 is a block diagram of a photodetection system according to the present embodiment. More specifically, FIG. 10 is a block diagram of a distance image sensor and a light source device as an example of the distance image generation device described in the above embodiment.

As illustrated in FIG. 10, the distance image sensor 401 includes an optical system 402, a photoelectric conversion device 403, an image processing circuit 404, a monitor 405, and a memory 406. The distance image sensor 401 receives light (modulated light or pulsed light) emitted from a light source device 411 toward an object and reflected by the surface of the object. The distance image sensor 401 can acquire a distance image corresponding to a distance to the object based on a time period from light emission to light reception.

The optical system 402 includes one or a plurality of lenses, and guides image light (incident light) from the object to the photoelectric conversion device 403 to form an image on a light receiving surface (sensor portion) of the photoelectric conversion device 403.

As the photoelectric conversion device 403 and the image processing circuit 404, the photodetection device 32 and the arithmetic processing device 33 of the above-described embodiment can be applied. The photoelectric conversion device 403 supplies a distance signal indicating a distance obtained from the received light signal to the image processing circuit 404.

The image processing circuit 404 performs image processing for forming a distance image based on the distance signal supplied from the photoelectric conversion device 403. The distance image (image data) obtained by the image processing can be displayed on the monitor 405 and stored (recorded) in the memory 406.

The distance image sensor 401 configured in this manner can acquire an accurate distance image by applying the configuration of the above-described embodiment.

Fourth Embodiment

Figure 11A:
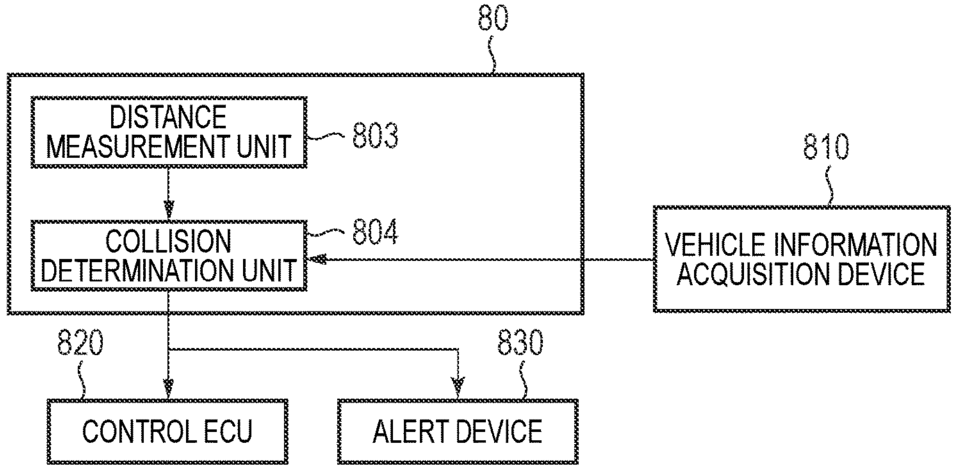
FIGS. 11A and 11B are schematic diagrams of equipment according to a fourth embodiment.
Figure 11B:
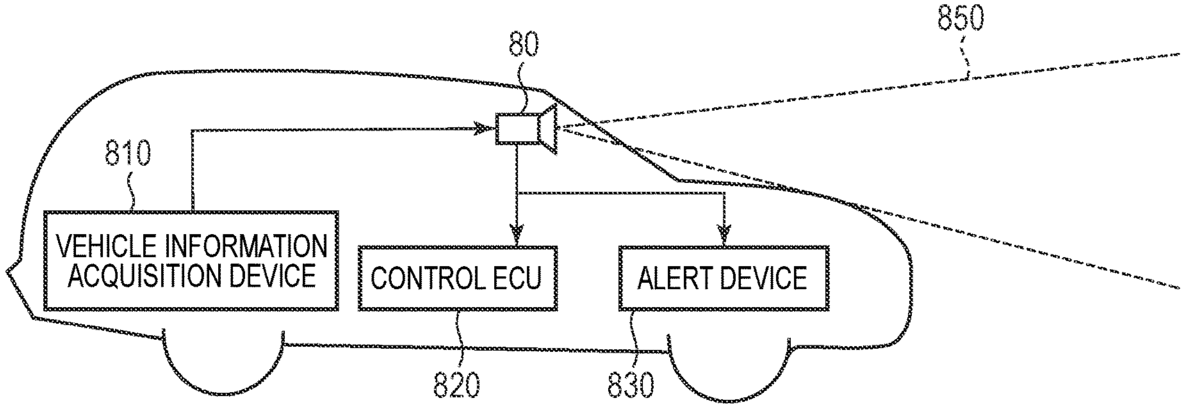

FIGS. 11A and 11B are block diagrams of equipment relating to an in-vehicle ranging device according to the present embodiment. Equipment 80 includes a distance measurement unit 803, which is an example of the distance image generation device of the above-described embodiments, and a signal processing device (processing device) that processes a signal from the distance measurement unit 803. The equipment includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 11B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present disclosure is not limited to the above embodiment, and various modifications are possible. For example, an example in which some of the configurations of any one of the embodiments are added to other embodiments and an example in which some of the configurations of any one of the embodiments are replaced with some of the configurations of other embodiments are also embodiments of the present disclosure.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-086885, filed May 27, 2022, which is hereby incorporated by reference herein in its entirety.

What is claimed is:

1. A distance image generation device comprising:

an acquisition unit configured to acquire a micro-frame constituted by a one-bit signal based on incident light to a photoelectric conversion element; and a synthesis unit configured to generate a sub-frame constituted by a multi-bit signal by synthesizing a plurality of the micro-frames acquired in different periods from each other, wherein in one ranging frame period, the synthesis unit generates a first sub-frame and a second sub-frame, used for generating one distance image, and wherein the number of the plurality of micro-frames synthesized when generating the first sub-frame and the number of the plurality of micro-frames synthesized when generating the second sub-frame are different from each other, wherein each of the first sub-frame and the second sub-frame is associated with a distance between the photoelectric conversion element and an object, wherein the synthesis unit generates either the first sub-frame or the second sub-frame according to the distance, wherein the number of the plurality of micro-frames synthesized when generating the second sub-frame is less than the number of the plurality of micro-frames synthesized when generating the first sub-frame, and wherein the synthesis unit generates the first sub-frame when the distance is equal to or less than a predetermined threshold value, and generates the second sub-frame when the distance is greater than the predetermined threshold value.

2. A distance image generation device comprising:

an acquisition unit configured to acquire a micro-frame constituted by a one-bit signal based on incident light to a photoelectric conversion element; and a synthesis unit configured to generate a sub-frame constituted by a multi-bit signal by synthesizing a plurality of the micro-frames acquired in different periods from each other, wherein in one ranging frame period, the synthesis unit generates a first sub-frame and a second sub-frame, used for generating one distance image, and wherein the number of the plurality of micro-frames synthesized when generating the first sub-frame and the number of the plurality of micro-frames synthesized when generating the second sub-frame are different from each other, wherein each of the first sub-frame and the second sub-frame is associated with a distance between the photoelectric conversion element and an object, wherein the synthesis unit generates either the first sub-frame or the second sub-frame according to the distance, wherein the number of the plurality of micro-frames synthesized when generating the second sub-frame is less than the number of the plurality of micro-frames synthesized when generating the first sub-frame, and wherein the synthesis unit generates the first sub-frame when the distance is greater than a predetermined threshold value, and generates the second sub-frame when the distance is equal to or less than the predetermined threshold value.

3. The distance image generation device according to claim 1 further comprising a distance image generation unit configured to generate a distance image indicating a distance to an object based on the multi-bit signal of each of the first sub-frame and the second sub-frame.

4. The distance image generation device according to claim 3, wherein the distance image generation unit generates the distance image after correcting a gradation of at least one of the first sub-frame and the second sub-frame.

5. The distance image generation device according to claim 1, wherein one micro-frame is constituted by a plurality of one-bit signals respectively corresponding to a plurality of photoelectric conversion elements arranged to form a plurality of rows and a plurality of columns, and wherein the plurality of one-bit signals is simultaneously acquired for each of the plurality of photoelectric conversion elements.

6. The distance image generation device according to claim 5 further comprising a light source device, wherein an acquisition of the plurality of one-bit signals is started in synchronization with a light emission timing of the light source device.

7. The distance image generation device according to claim 1, wherein one sub-frame is constituted by a plurality of multi-bit signals respectively corresponding to a plurality of photoelectric conversion elements arranged to form a plurality of rows and a plurality of columns, and wherein the plurality of multi-bit signals has the same number of bits.

8. The distance image generation device according to claim 1, wherein the photoelectric conversion element includes an avalanche photodiode, and wherein the one-bit signal indicates whether or not a photon is incident on the avalanche photodiode during a period in which the micro-frame is acquired.

9. The distance image generation device according to claim 1, wherein the synthesis unit generates the multi-bit signal by adding a value of the one-bit signal every time the micro-frame is acquired.

10. A photodetection system comprising:

the distance image generation device according to claim 1; and a memory configured to store a distance image generated by the distance image generation device.

11. A movable body comprising:

the distance image generation device according to claim 1; and a movable body control unit configured to control the movable body based on distance information acquired by the distance image generation device.

12. A distance image generation device comprising:

an acquisition unit configured to acquire a micro-frame constituted by a one-bit signal based on incident light to a photoelectric conversion element; and a synthesis unit configured to generate a sub-frame constituted by a multi-bit signal by synthesizing a plurality of the micro-frames acquired in different periods from each other, wherein in one ranging frame period, the synthesis unit generates a first sub-frame and a second sub-frame, used for generating one distance image, wherein the number of the plurality of micro-frames synthesized when generating the first sub-frame and the number of the plurality of micro-frames synthesized when generating the second sub-frame are different from each other, wherein the distance image generation device further comprising a distance image generation unit configured to generate a distance image indicating a distance to an object based on the multi-bit signal of each of the first sub-frame and the second sub-frame, and wherein the distance image generation unit generates the distance image after correcting a gradation of at least one of the first sub-frame and the second sub-frame.

13. The distance image generation device according to claim 2 further comprising a distance image generation unit configured to generate a distance image indicating a distance to an object based on the multi-bit signal of each of the first sub- frame and the second sub-frame.

14. The distance image generation device according to claim 13, wherein the distance image generation unit generates the distance image after correcting a gradation of at least one of the first sub-frame and the second sub-frame.

15. The distance image generation device according to claim 2, wherein one micro-frame is constituted by a plurality of one-bit signals respectively corresponding to a plurality of photoelectric conversion elements arranged to form a plurality of rows and a plurality of columns, and wherein the plurality of one-bit signals is simultaneously acquired for each of the plurality of photoelectric conversion elements.

16. A photodetection system comprising:

the distance image generation device according to claim 2; and a memory configured to store a distance image generated by the distance image generation device.

17. A movable body comprising:

the distance image generation device according to claim 2; and a movable body control unit configured to control the movable body based on distance information acquired by the distance image generation device.

18. A photodetection system comprising:

the distance image generation device according to claim 12; and a memory configured to store a distance image generated by the distance image generation device.

19. A movable body comprising:

the distance image generation device according to claim 12; and a movable body control unit configured to control the movable body based on distance information acquired by the distance image generation device.

* * * * *